United States Patent
Kang et al.

(10) Patent No.: US 9,590,238 B2
(45) Date of Patent: Mar. 7, 2017

(54) COMPOSITE FOR ANODE ACTIVE MATERIAL AND METHOD OF PREPARING THE SAME

(71) Applicant: LG Chem, Ltd., Seoul (KR)

(72) Inventors: Yoon Ah Kang, Daejeon (KR); Yong Ju Lee, Daejeon (KR); Rae Hwan Jo, Daejeon (KR); Je Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 30 days.

(21) Appl. No.: 14/166,943

(22) Filed: Jan. 29, 2014

(65) Prior Publication Data

US 2014/0154576 A1    Jun. 5, 2014

Related U.S. Application Data

(63) Continuation of application No. PCT/KR2013/010866, filed on Nov. 27, 2013.

(30) Foreign Application Priority Data

Nov. 30, 2012  (KR) .................. 10-2012-0138530
Nov. 26, 2013  (KR) .................. 10-2013-0144587

(51) Int. Cl.
| | |
|---|---|
| H01M 4/131 | (2010.01) |
| H01M 4/36 | (2006.01) |
| H01M 4/48 | (2010.01) |
| H01M 4/587 | (2010.01) |
| H01M 4/62 | (2006.01) |
| B82Y 30/00 | (2011.01) |
| H01M 10/052 | (2010.01) |

(52) U.S. Cl.
CPC .......... *H01M 4/366* (2013.01); *H01M 4/483* (2013.01); *H01M 4/587* (2013.01); *H01M 4/625* (2013.01); *B82Y 30/00* (2013.01); *H01M 10/052* (2013.01); *Y10S 977/742* (2013.01); *Y10S 977/948* (2013.01)

(58) Field of Classification Search
CPC ...... H01M 4/366; H01M 4/483; H01M 4/587; H01M 4/625; H01M 10/052; B82Y 30/00; Y10S 977/742; Y10S 977/948
See application file for complete search history.

(56) References Cited

U.S. PATENT DOCUMENTS

| | | | |
|---|---|---|---|
| 6,001,139 A | 12/1999 | Asanuma et al. | |
| 6,733,922 B2 | 5/2004 | Matsubara et al. | |
| 2004/0253517 A1 | 12/2004 | Kim et al. | |
| 2005/0233213 A1 | 10/2005 | Lee et al. | |
| 2006/0068287 A1 | 3/2006 | Morita et al. | |
| 2006/0134516 A1* | 6/2006 | Im et al. .................. | 429/218.1 |
| 2007/0092796 A1 | 4/2007 | Matsuda et al. | |
| 2007/0190416 A1 | 8/2007 | Yamada et al. | |
| 2010/0203392 A1 | 8/2010 | Yamada et al. | |
| 2010/0243964 A1 | 9/2010 | Lee et al. | |
| 2011/0068274 A1 | 3/2011 | Zaghib et al. | |
| 2011/0165464 A1 | 7/2011 | Yew et al. | |
| 2012/0208083 A1 | 8/2012 | Ati et al. | |
| 2013/0078490 A1 | 3/2013 | Morita et al. | |
| 2013/0244106 A1 | 9/2013 | Chang et al. | |
| 2014/0017570 A1 | 1/2014 | Naoi et al. | |
| 2014/0120420 A1 | 5/2014 | Zaghib et al. | |

FOREIGN PATENT DOCUMENTS

| | | |
|---|---|---|
| CA | 2786012 A1 | 10/2012 |
| CN | 1304187 A | 7/2001 |
| CN | 101180753 A | 5/2008 |
| CN | 101494284 A | 7/2009 |
| CN | 101796670 A | 8/2010 |
| CN | 101990719 A | 3/2011 |
| CN | 102365774 A | 2/2012 |
| CN | 102593426 A | 7/2012 |
| EP | 1873846 A1 | 1/2008 |
| EP | 2018677 A1 | 1/2009 |
| EP | 2416410 A2 | 2/2012 |
| JP | 2005-135925 A | 5/2005 |
| JP | 2007-165108 A | 6/2007 |
| JP | 2008-210618 A | 9/2008 |
| JP | 2011-204564 A | 10/2011 |
| JP | 2013-073764 A | 4/2013 |
| KR | 2002-0070764 A | 9/2002 |
| KR | 2005-0090218 A | 9/2005 |
| KR | 10-0578870 B1 | 5/2006 |
| KR | 10-0589309 B1 | 6/2006 |
| KR | 2006-0087003 A | 8/2006 |
| KR | 2007-0109634 A | 11/2007 |

(Continued)

OTHER PUBLICATIONS

European Search Report from PCT/KR2013/010667, dated Nov. 27, 2014.
International Search Report from PCT/KR2013/010867, dated Mar. 10, 2014.
Lestriez et al, "Functions of polymers in composite electrodes of lithium ion batteries," Comptes Rendus Chimie, Elsevier, Paris, FR, vol. 13, No. 11, Mar. 29, 2010, pp. 1341-1350.
International Search Report from PCT/KR2013/010866, dated Mar. 10, 2014.
Liang Cheng et al.: "General synthesis of carbon-coated nanostructure Li4Ti5O12 as a high rate electrode material for Li-ion intercalation", Journal of Materials Chemistry, Royal Society of Chemistry, GB, vol. 20, No. 3, Jan. 21, 2010, pp. 595-602.
Partial Supplementary European Search Report for Application No. 13834350.4 dated Mar. 9, 2016.

(Continued)

*Primary Examiner* — Cynthia K Walls
(74) *Attorney, Agent, or Firm* — Lerner, David, Littenberg, Krumholz & Mentlik, LLP

(57) ABSTRACT

Provided are a composite for an anode active material and a method of preparing the same. More particularly, the present invention provides a composite for an anode active material including a (semi) metal oxide and an amorphous carbon layer on a surface of the (semi) metal oxide, wherein the amorphous carbon layer comprises a conductive agent, and a method of preparing the composite.

9 Claims, No Drawings

(56) References Cited

FOREIGN PATENT DOCUMENTS

| KR | 2010-0109483 A | 10/2010 | |
|---|---|---|---|
| KR | 2012-0093764 A | 8/2012 | |
| WO | 2007/059687 A1 | 5/2007 | |
| WO | 2007/133005 A1 | 11/2007 | |
| WO | WO 2007/133005 * | 11/2007 | .............. H01M 4/02 |
| WO | 2011152263 A1 | 12/2011 | |
| WO | 2012/133844 A1 | 10/2012 | |

OTHER PUBLICATIONS

Nahong Zhao et al.: "Preparation of Nanowire Arrays of Amorphous Carbon Nanotube-Coated Single Crystal $SnO_2$", Chemistry of Materials, vol. 20, No. 8, Mar. 18, 2008, pp. 2612-2614, XP055253316.

Extended European Search Report for Application No. EP13834350 dated Sep. 5, 2016.

* cited by examiner

COMPOSITE FOR ANODE ACTIVE MATERIAL AND METHOD OF PREPARING THE SAME

CROSS-REFERENCE TO RELATED APPLICATIONS

The present application is a continuation of International Application No. PCT/KR2013/010866 filed on Nov. 27, 2013, which claims the benefit of Korean Patent Application No. 10-2013-0144587, filed on Nov. 26, 2013 and Korean Patent Application No. 10-2012-0138530, filed on Nov. 30, 2012, the disclosures of which are incorporated herein by reference.

TECHNICAL FIELD

The present invention relates to a composite for an anode active material and a method of preparing the same.

BACKGROUND ART

In line with recent miniaturization and lightweight trends in electronic devices, the miniaturization and weight reduction have also been required for batteries acting as a power source. Lithium-based secondary batteries have been commercialized as a battery that may be miniaturized, light weighted, and charged to high capacity, and the lithium-based secondary batteries have been used in portable electronic devices, such as small video cameras, mobile phones, and notebooks, and communication devices.

Lithium secondary batteries, as an energy storage device having high energy and power, may be advantageous in that capacities or operating voltages thereof are higher than those of other types of batteries. However, since the safety of the batteries may be problematic due to the high energy, there may be a risk of explosion or fire. In particular, since high energy and output characteristics are required for hybrid vehicles that have recently been in the spotlight, it may be considered that the safety is more important.

In general, a lithium secondary battery is composed of a cathode, an anode, and an electrolyte, in which charge and discharge may be possible, because lithium ions, which are discharged from a cathode active material by first charging, may act to transfer energy while moving between both electrodes, for example, the lithium ions are intercalated into an anode active material, i.e., carbon particles, and deintercalated during discharging.

Meanwhile, since there is a continuous need for high-capacity batteries due to the development of portable electronic devices, research into high-capacity anode materials, such as tin (Sn) and silicon (Si), which have significantly higher capacity per unit mass than that of carbon that is used as a typical anode material, have been actively conducted. In the case that Si or a Si alloy is used as an anode active material, volume expansion may increase and cycle characteristics may degrade. In order to address the above limitations, the Si or the Si alloy may be mixed with graphite to be used as the anode active material. However, since the graphite may be non-uniformly distributed during the mixing, the cycle characteristics and lifetime may degrade.

DISCLOSURE OF THE INVENTION

Technical Problem

The present invention provides a composite for an anode active material having improved electrical conductivity and a method of preparing the same.

Technical Solution

According to an aspect of the present invention, there is provided a composite for an anode active material including: a (semi) metal oxide(metal(loid) oxide); and an amorphous carbon layer on a surface of the (semi) metal oxide, wherein the amorphous carbon layer comprises a conductive agent.

According to another aspect of the present invention, there is provided a method of preparing a composite for an anode active material including preparing a mixed solution by mixing a conductive agent, a polymer, and a (semi) metal oxide in a solvent; and performing a heat treatment after spray drying the mixed solution.

Advantageous Effects

According to the present invention, since a surface of (semi) metal oxide is coated with an amorphous carbon layer including a conductive agent, a composite for an anode active material having improved electrical conductivity may be provided. Also, a performance of a secondary battery may be improved by including the composite for an anode active material.

MODE FOR CARRYING OUT THE INVENTION

The present invention may provide a composite for an anode active material including a (semi) metal oxide (metal(loid) oxide) and an amorphous carbon layer on a surface of the (semi) metal oxide, wherein the amorphous carbon layer comprises a conductive agent.

That is, in a composite for an anode active material according to an embodiment of the present invention, electrical conductivity may be improved by coating a surface of (semi) metal oxide with an amorphous carbon layer including a conductive agent by a heat treatment, and thus, a performance of a secondary battery may be improved.

First, in the composite for an anode active material according to the embodiment of the present invention, a type of (semi) metal of the (semi) metal oxide is not particularly limited so long as the (semi) metal does not adversely affect operating characteristics of a battery while exhibiting relatively higher hydrophilicity and polarity than the conductive agent and a material of the carbon layer according to the selection of the (semi) metal, and the (semi) metal may be silicon (Si) or tin (Sn). Specifically, the (semi) metal oxide may include one or more selected from the group consisting of $SiO_x$, $AlO_x$, $SnO_x$, $SbO_x$, $BiO_x$, $AsO_x$, $GeO_x$, $PbO_x$, $ZnO_x$, $CdO_x$, $InO_x$, $TiO_x$, and $GaO_x$ (where 0<x<2).

Also, the conductive agent may be selected from the group consisting of a line-type conductive agent, a point-type conductive agent, and a mixture thereof.

The line-type conductive agent may include one or more selected from the group consisting of carbon nanotubes, carbon nanofibers, and graphene.

Since the carbon nanotubes and the carbon nanofibers have excellent strength and high resistance to fracture, the deformation of a current collector due to the repetition of charging and discharging or external force may be prevented and the oxidation of the surface of the current collector in unusual environments, such as high temperature and overcharging, of the battery may be prevented. Thus, the safety of the battery may be significantly improved. Also, the graphene has a surface area of about 2,600 m$^2$/g and an electron mobility ranging from 15,000 cm$^2$/Vs to 200,000 cm$^2$/Vs, in which the graphene has relatively useful properties in comparison to other carbon materials. In particular, the electron transfer rate of graphene is close to the speed of light, and the reason for this is that electrons move like massless particles in the graphene. The graphene may be prepared by a typical Scotch tape method, an epitaxy method using a silicon carbide insulator, a chemical method using a reducing agent, and a method using a metal catalyst.

The point-type conductive agent may include one or more selected from the group consisting of carbon black, acetylene black, Ketjen black, channel black, furnace black, lamp black, and thermal black.

The line-type conductive agent and the point-type conductive agent may be classified according to the shape of the conductive agent. However, in the present invention, the classification of the line-type conductive agent and the point-type conductive agent may be in accordance with an aspect ratio (major axis length/minor axis length). For example, in the case that the aspect ratio is 1.5 or more, the conductive agent may be a line-type conductive agent. In the case in which the aspect ratio is less than 1.5, the conductive agent may be a point-type conductive agent.

The conductive agent may be selected from the group consisting of crystalline carbon, amorphous carbon, and a mixture thereof. In the case that the conductive agent is amorphous carbon, the secondary battery may have high discharge capacity and excellent rate characteristics. However, irreversible capacity may be high, a charge and discharge efficiency may decrease, and energy density may decrease due to low volume density and electrical conductivity. In contrast, in the case in which the conductive agent is crystalline carbon, the discharge capacity of the secondary battery may decrease. However, since the electrical conductivity and energy density may be excellent and the reversibility of charge and discharge processes is relatively excellent in comparison to the amorphous carbon, the crystalline carbon may be used by being mixed with the amorphous carbon in order to maximize the advantages of each carbon.

An amount of the conductive agent may be in a range of 1 wt % to 20 wt % based on a total weight of the (semi) metal oxide. In the case that the amount of the conductive agent is less than 1 wt %, an effect due to the conductive agent may be insignificant. In the case in which the amount of the conductive agent is greater than 20 wt %, the capacity of the secondary battery may decrease.

Also, in the composite for an anode active material according to the embodiment of the present invention, the amorphous carbon layer may be derived from an organic polymer component. Specifically, the amorphous carbon layer may be formed by heat treating the organic polymer component.

In this case, the organic polymer component is not particularly limited so long as it is a resin acting as a matrix. Typical examples of a polymer resin usable as a binder material for a typical secondary battery may be a polymer including one or more selected from the group consisting of carboxymethyl cellulose (CMC), sucrose, polyacrylonitrile (PAN), polyvinylidene fluoride (PVDF), and polyvinyl alcohol (PVA).

That is, the composite for an anode active material of the present invention may be formed in a structure, in which the amorphous carbon layer forms a matrix and the conductive agent is included as a filler in the matrix.

The conductive agent included in the amorphous carbon layer is a point-type or line-type conductive agent, wherein the conductive agent may be disposed on the surface of the (semi) metal oxide. The conductive agent may have a form, in which the conductive agent is dispersed on the surface of the (semi) metal oxide due to a binder for a secondary battery which is carburized on the surface of the (semi) metal oxide. In a case where the binder for a secondary battery is absent, the conductive agent may agglomerate or may not be included on the surface of the (semi) metal oxide.

The entire or partial surface of the (semi) metal oxide may be coated with the amorphous carbon layer. Specifically, a carbon content of the amorphous carbon layer may be 2 parts by weight to 30 parts by weight based on 100 parts by weight of the (semi) metal oxide. In the case that the carbon content of the amorphous carbon layer is less than 2 parts by weight, surfaces of (semi) metal oxide particles may not be uniformly coated with carbon. In the case in which the carbon content of the amorphous carbon layer is greater than 30 parts by weight, an excessive amount of carbon may be coated to reduce the capacity of the secondary battery. In this case, when the carbon content of the amorphous carbon layer is greater than 15 parts by weight based on 100 parts by weight of the (semi) metal oxide, the entire surface of the (semi) metal oxide may be coated with a carbon layer. When the carbon content of the amorphous carbon layer is less than 15 parts by weight, the partial surface of the (semi) metal oxide may be intermittently coated.

A ratio of a diameter of the amorphous carbon layer to a particle diameter of the (semi) metal oxide, for example, may be 11.5:10. A thickness of the amorphous carbon layer may be in a range of 5 nm to 70 nm.

Also, the present invention may provide a method of preparing a composite for an anode active material including preparing a mixed solution by mixing a conductive agent, a polymer, and a (semi) metal oxide in a solvent; and performing a heat treatment after spray drying the mixed solution.

The polymer may be a binder material, and specifically, may include one or more selected from the group consisting of CMC, sucrose, PAN, PVDF, and PVA. The carbon may be derived from the polymer.

Furthermore, an amount of the conductive agent may be in a range of 1 wt % to 20 wt % based on a total weight of the (semi) metal oxide. In the case that the amount of the conductive agent is less than 1 wt %, an effect due to the conductive agent may be insignificant. In the case in which the amount of the conductive agent is greater than 20 wt %, the capacity of the secondary battery may decrease.

The solvent may include an organic solvent, such as N-methylpyrrolidone (NMP), dimethylformamide (DMF), acetone, and dimethylacetamide, and/or water. The above solvents may be used alone or in a mixture of two or more thereof.

Also, a viscosity of the solution including the conductive agent, polymer, and (semi) metal oxide may be 1,000 cps or less. In the case that the viscosity is greater than 1,000 cps, a spray drying process may not be performed due to high viscosity.

The spray drying may produce granular powder by substantially removing the moisture of the solvent, and an amorphous carbon layer derived from the conductive agent and polymer may be uniformly distributed on the surface of the (semi) metal oxide by the spray drying. The spray drying may be performed using a spray dryer which includes a drying chamber in which the spray drying is performed, a hot air inlet pipe that is connected to the drying chamber and supplies hot air to the drying chamber to remove a dispersant, an air outlet that is connected to the drying chamber to exhaust air cooled during the spray drying, a raw material feed pipe that penetrates a wall constituting the drying chamber and supplies a raw material to the drying chamber to perform spraying, and powder recovery pipes that are connected to the drying chamber to recover powders formed in the drying chamber by the spray drying. However, the present invention is not limited thereto.

Specifically, the spraying may be performed by injecting the mixed solution at a rate of about 15 cc/min to about 25 cc/min, an inlet temperature in the drying chamber of the spray dryer of about 200° C. to about 250° C., and an outlet temperature of about 60° C. to about 80° C.

Also, the heat treatment may be performed at a temperature ranging from 600° C. to 1200° C., and an amorphous carbon layer, as a matrix, may be formed as the polymer, i.e., an organic binder, coated on the (semi) metal oxide is carburized by the heat treatment. Simultaneously, the conductive agent, as a filler in the matrix, may also be adhered to the surface of the (semi) metal oxide. In the case that the heat treatment temperature is less than 600° C., the surface of the (semi) metal oxide may be not coated with carbon because the polymer is not carburized. In the case in which the heat treatment temperature is greater than 1200° C., crystals of the (semi) metal oxide may grow due to the high temperature.

Furthermore, the present invention may provide a secondary battery including a cathode including a cathode active material; a separator; an anode including the composite for an anode active material of the present invention that is coated with an amorphous carbon layer including a conductive agent; and an electrolyte.

Since the secondary battery according to an embodiment of the present invention may include the composite for an anode active material of the present invention as an anode active material, the performance of the secondary battery may be improved.

In this case, the anode, for example, may be prepared by coating an anode current collector with a mixture of an anode active material, a conductive agent, and a binder, and then drying the coated anode current collector. If necessary, the conductive agent may be further added. In this case, a total amount of the conductive agent used in the preparation of the anode may be controlled to be 20 wt % or less. The cathode may also be prepared by coating a cathode current collector with a cathode active material and drying the coated cathode current collector.

The separator is disposed between the cathode and the anode, and a thin insulating film having high ion permeability and mechanical strength may be used as the separator. Since the current collectors, electrode active materials, conductive agent, binder, filler, separator, electrolyte, and lithium salt are known in the art, the detailed descriptions thereof are omitted in the present specification.

The separator is disposed between the cathode and the anode to form a battery structure, the battery structure is wound or folded to put in a cylindrical battery case or prismatic battery case, and then a secondary battery is completed when the electrolyte is injected thereinto. Also, the battery structure is stacked in a bi-cell structure, impregnated with the electrolyte, and a secondary battery is then completed when the product thus obtained is put in a pouch and sealed.

Hereinafter, the present invention will be described in detail, according to specific examples. The invention may, however, be embodied in many different forms and should not be construed as being limited to the embodiments set forth herein.

Example 1

0.1 g of carbon nanotubes as a line-type conductive agent and 4.5 g of carboxymethyl cellulose as a polymer were used, and 10 g of SiO was used as a (semi) metal oxide. The carbon nanotubes, carboxymethyl cellulose, and SiO were mixed in water to prepare a mixed solution. Subsequently, the mixed solution was spray dried at a rate of about 15 cc/min to about 25 cc/min, an inlet temperature in a drying chamber of a spray dryer of about 200° C. to about 250° C., and an outlet temperature of about 60° C. to about 80° C., and then heat treated at 700° C. to prepare a composite for an anode active material, in which a surface of SiO was coated with an amorphous carbon layer that was derived from carbon nanotubes and carboxymethyl cellulose.

Example 2

A composite for an anode active material, in which a surface of SiO was coated with an amorphous carbon layer that was derived from carbon black and sucrose, was prepared in the same manner as in Example 1 except that 0.1 g of carbon black as a point-type conductive agent and 6 g of sucrose as a polymer were used.

Example 3

A composite for an anode active material, in which a surface of SiO was coated with an amorphous carbon layer that was derived from carbon nanotubes and PAN, was prepared in the same manner as in Example 1 except that 0.1 g of carbon nanotubes as a line-type conductive agent and 14 g of PAN as a polymer were used.

Example 4

A composite for an anode active material, in which a surface of SiO was coated with carbon that was derived from carbon black and PVA, was prepared in the same manner as in Example 1 except that 0.1 g of carbon black as a point-type conductive agent and 16 g of PVA as a polymer were used.

Example 5

Preparation of Anode Slurry

The composite prepared in Example 1 was mixed with natural graphite, carbon black, and polytetrafluoroethylene at a weight ratio of 30:65:2:3 to prepare an anode slurry.

Comparative Example 1

Preparation of Anode Slurry

An anode slurry was prepared in the same manner as in Example 5 except that commercial silicon monoxide was used instead of using the composites prepared in Examples 1 to 4.

Example 6

Preparation of Secondary Battery

One surface of a copper current collector was coated with the anode slurry prepared in Example 5 to a thickness of 65 μm, dried and rolled. Then, an anode was prepared by punching into a predetermined size.

$LiPF_6$ was added to a non-aqueous electrolyte solvent prepared by mixing ethylene carbonate and diethyl carbonate at a volume ratio of 30:70 to prepare a 1 M $LiPF_6$ non-aqueous electrolyte solution.

A lithium foil was used as a counter electrode, a polyolefin separator was disposed between both electrodes, and a coin-type secondary battery was then prepared by injecting the electrolyte solution.

Comparative Example 2

Preparation of Secondary Battery

A secondary battery was prepared in the same manner as in Example 6 except that the anode slurry prepared in Comparative Example 1 was used.

Experimental Example 1

Lifetime Characteristics and Capacity Characteristics Analysis

In order to investigate capacity characteristics and lifetime characteristics of the secondary batteries prepared in Example 6 and Comparative Example 2 according to charge and discharge cycles, the secondary batteries prepared in Example 6 and Comparative Example 2 were charged at 0.1 C to a voltage of 5 mV and charged to a current of 0.005 C at 5 mV under constant current/constant voltage (CC/CV) conditions at 23° C., and then discharged at 0.1 C to a voltage of 1.5 V under a constant current (CC) condition to measure capacities.

Thereafter, the secondary batteries prepared in Example 6 and Comparative Example 2 were charged at 0.5 C to a voltage of 5 mV and charged to a current of 0.005 C at 5 mV under constant current/constant voltage (CC/CV) conditions, and then discharged at 0.5 C to a voltage of 1.0 V under a constant current (CC) condition. This charge and discharge cycle was repeated 1 to 50 times. The results thereof are presented in Table 1 below.

TABLE 1

| Examples | Lifetime characteristics (%) |
| --- | --- |
| Example 6 | 91.6 |
| Comparative Example 2 | 81.3 |

Lifetime characteristics: (discharge capacity in a 49th cycle/first cycle discharge capacity)×100

As illustrated in Table 1, it may be understood that the lifetime characteristics of the secondary battery prepared in Example 6 using the composite, in which the surface of SiO was coated with the amorphous carbon layer that was derived from carbon nanotubes and carboxymethyl cellulose, as an anode active material were improved to about 10% or more in comparison to the secondary battery prepared in Comparative Example 2 using SiO as an anode active material.

It may be estimated that since the electrical conductivity was improved by using the composite that included SiO having the surface coated with the amorphous carbon layer including the conductive agent, the lifetime characteristics of the secondary battery was further improved.

INDUSTRIAL APPLICABILITY

According to the present invention, since a surface of (semi) metal oxide is coated with an amorphous carbon layer including a conductive agent, a composite for an anode active material having improved electrical conductivity may be provided. Since the composite for an anode active material may improve lifetime characteristics of a secondary battery, the composite for an anode active material may be suitable for secondary batteries.

The invention claimed is:

1. An anode slurry comprising:
   i) a composite for an anode active material comprising a core consisting of a core oxide selected from the group consisting of metal oxide, semi metal oxide and a mixture thereof;
   an amorphous carbon layer coated on a surface of the core oxide; and
   a conductive agent for the composite dispersed in the amorphous carbon layer,
   wherein the amorphous carbon layer forms a matrix and the conductive agent is dispersed as a filler in the matrix;
   ii) a conductive agent for the anode slurry;
   iii) a binder; and
   iv) a natural graphite.

2. The anode slurry of claim 1, wherein the core oxide comprises one or more selected from the group consisting of $SiO_x$, $AlO_x$, $SnO_x$, $SbO_x$, $BiO_x$, $AsO_x$, $GeO_x$, $PbO_x$, $ZnO_x$, $CdO_x$, $InO_x$, $TiO_x$, and $GaO_x$, where $0<x<2$.

3. The anode slurry of claim 1, wherein the conductive agent for the composite is one or more selected from the group consisting of carbon nanotubes, carbon nanofibers, graphene, carbon black, acetylene black, Ketjen black, channel black, furnace black, lamp black, and thermal black.

4. The anode slurry of claim 1, wherein the conductive agent for the composite is selected from the group consisting of crystalline carbon, amorphous carbon, and a mixture thereof.

5. The anode slurry of claim 1, wherein an amount of the conductive agent for the composite is in a range of 1 wt % to 20 wt % based on a total weight of the core oxide.

6. The anode slurry of claim 1, wherein a carbon content of the amorphous carbon layer is 2 parts by weight to 30 parts by weight based on 100 parts by weight of the core oxide.

7. The anode slurry of claim 1, wherein the entire or partial surface of the core oxide is coated with the amorphous carbon layer.

8. The anode slurry of claim 1, wherein a thickness of the amorphous carbon layer is in a range of 5 nm to 70 nm.

9. A secondary battery comprising:
   a cathode including a cathode active material;
   a separator;
   an anode prepared from the anode slurry of claim 1; and
   an electrolyte.

* * * * *